United States Patent [19]

Shah

[11] Patent Number: 4,828,928
[45] Date of Patent: May 9, 1989

[54] MONOAXIAL SHRINK FILM

[75] Inventor: Gautam P. Shah, Simpsonville, S.C.

[73] Assignee: W. R. Grace & Co., Duncan, S.C.

[21] Appl. No.: 943,514

[22] Filed: Dec. 17, 1986

[51] Int. Cl.4 .............................................. B32B 27/08
[52] U.S. Cl. .................................. 428/518; 428/343;
428/516; 428/910
[58] Field of Search ............... 428/516, 518, 349, 910, 428/343

[56] References Cited

U.S. PATENT DOCUMENTS 3,817,821  6/1974  Gallini .................................. 428/516
4,188,443  2/1980  Mueller et al. ....................... 428/216
4,258,166  3/1981  Canterino et al. ................ 526/348.1
4,380,567  4/1983  Shigemoto .......................... 428/349

Primary Examiner—Edith Buffalow
Attorney, Agent, or Firm—John J. Toney; William D. Lee, Jr.; Mark B. Quatt

[57] ABSTRACT

A coextruded multiple layer film is oriented in primarily the longitudinal direction, and comprises a core layer comprising high density polyethylene, outer layers comprising ethylene propylene copolymer, polypropylene, or blends thereof, and intermediate layers which bond the outer layers to the cure layer and comprise an ethylene copolymer.

2 Claims, 1 Drawing Sheet

MONOAXIAL SHRINK FILM

BACKGROUND OF THE INVENTION

The present invention relates generally to shrink films, and more particularly to monoaxially oriented shrink films.

Various films and laminates have been proposed for use particularly as label material for the labels of beverage bottles and the like. These films or laminates are preferably monoaxially oriented in order to permit a tight label to be produced around the bottle or vessel, without the undesirable wrinkling and shrinking of the label which would occur with a biaxially oriented film.

The label material ideally possesses several properties making it particularly useful for this end use.

For example, the material should have the required stiffness (i.e. high modulus) to permit the use of the film in a rollstock form to feed toward a clipping means during the manufacture of the label. Lower modulus material would not be useful in such apparatus.

Suitable material should also possess surface properties that allow printing of the label with information such as verbal and graphic trademarks, ingredients, and other information directed to the contents and capacity of the vessel.

It may additionally be desirable to have a film with good optical properties.

Of interest is U.S. Pat. No. 4,355,076 issued to Gash wherein a monoaxially oriented polypropylene film may be laminated to a monoaxially oriented high density polyethylene film, said films produced by e.g. tubular blowing.

It is therefore an object of the present invention to provide a thermoplastic film useful in forming labels for vessels such as bottles, cans, and the like.

It is also an object of the present invention to provide such a label which can be monoaxially oriented.

It is an additional object of the present invention to provide such a film with relatively high modulus properties.

It is still another object of the present invention to provide such a film with good printability.

It is also an object of the present invention to provide a film having excellent optical properties.

SUMMARY OF THE INVENTION

In one aspect of the present invention, a multilayer film, oriented in primarily one direction, comprises a core layer comprising a high density polyethylene; two outer layers each comprising ethylene propylene copolymer, polypropylene, or blends thereof; and two intermediate layers each bonding the core layer to a respective outer layer, and comprising an ethylene copolymer.

In another aspect of the present invention, a method for making a multilayer film comprises simultaneously coextruding a first melt stream of a high density polyethylene from a first extruder, two split melt streams of an ethylene copolymer from a second extruder, a third melt stream of ethylene propylene copolymer, polypropylene, or blends thereof from a third extruder, and a fourth melt stream of ethylene propylene copolymer, polypropylene, or blends thereof from a fourth extruder; passing the coextruded melt streams through a coextrusion die to form a tubular film; rapidly cooling the tubular film; collapsing the cooled film; opening the cooled film to form a sheet; and drawing the sheet through heated rolls to stretch the film in the longitudinal direction.

DEFINITIONS

"Ethylene propylene copolymer" as used herein refers to a copolymer of ethylene and propylene having between about 2% and 5% by weight of the ethylene comonomer.

"Ethylene copolymer" as used herein refers to copolymers of ethylene and vinyl acetate, alkyl acrylate and alpha-olefin, and also refers to chemically modified derivatives of these materials.

BRIEF DESCRIPTION OF THE DRAWINGS

Further details are given below with reference to the sole drawing wherein.

DESCRIPTION OF THE PREFERRED EMBODIMENTS

Figure 1:
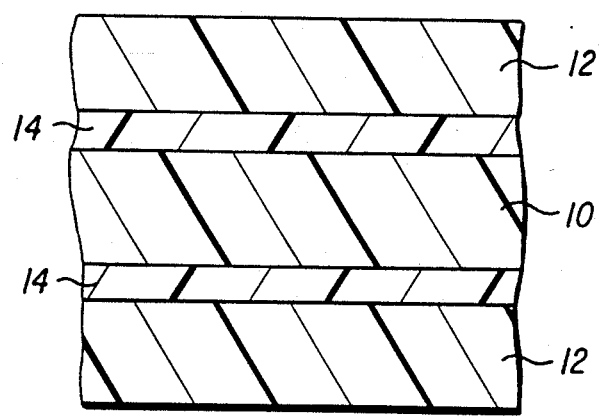
FIG. 1 is a schematic cross-section of a preferred embodiment of a multilayer film of the invention.

Referring specifically to the drawings, in FIG. 1 a schematic cross-section of a preferred embodiment of the multiply film of the invention is shown.

This film is particularly useful in forming labels for vessels such as bottles and cans.

The film structure is a multilayer composite having a core layer 10 comprising a high density polyethylene. A preferred, commercially available high density polyethylene is duPont Alathon 7835, having a density of about 0.96 gms/cc.

Outer layers 12 may be either an ethylene propylene copolymer, a polypropylene, or blends of these two materials. In blends, increasing the percentage of polypropylene imparts added stiffness, i.e. a higher modulus to the multilayer film. In a preferred embodiment, the blend comprises between about 5% and 95% ethylene propylene copolymer (EPC) and between about 95% and 5% polypropylene (PP).

For a stiffer film, i.e. a film with higher modulus, a more preferred blend comprises about 60% EPC and about 40% PP.

For a more flexible film, i.e. a film with lower modulus, a more preferred blend comprises about 92% EPC and about 8% PP. EPC contributes to the shrink characteristics of the film, so that the more flexible film will also exhibit better shrink characteristics such as higher free shrink at a given temperature, e.g. 200° F., than the stiffer film.

The outer layers 12 of the multilayer film each constitute preferably between about 10% and 30% of the total film thickness and more preferably about 20% of the total film thickness.

In the multilayer film, the outer layers are bonded to the core layer by intermediate layers 14 each comprising a copolymer of ethylene and a vinyl acetate (EVA), the copolymer having preferably between about 4% and 30% vinyl acetate by weight of the copolymer.

For stiffer films, the EVA preferably has about 9% vinyl acetate.

For a more flexible film, a vinyl acetate percentage of about 20% is preferred.

Other preferred materials for layers 14 include ethylene alkyl acrylate, especially ethylene butyl acrylate copolymer; very low density polyethylene; and chemical modified polymeric adhesives having carboxylic acid or acid anhydride.

The intermediate layers 14 of the film each constitute preferably between about 5% and 15% of the total film thickness, and more preferably about 10% of the total film thickness.

The high density polyethylene of the core layer has a density of preferably between 0.94 and 0.97 grams per cubic centimeter, and more preferably a density of about 0.96 grams per cubic centimeter. The core layer preferably comprises between about 25% and 70% of the total film thickness.

As indicated earlier with respect to the outer and intermediate layers, multilayer films having different modulus values can be produced by varying the composition or thickness of the core layer. For higher modulus films, a core layer thickness of about 50% is preferred. For lower modulus films, a core layer thickness of about 30% is preferred.

The film of the present invention is preferably made by coextrusion techniques in which melt streams of the various resins are extruded from respective extruders and passed through a die to form a tubular tape.

This tape has a thickness of preferably between about 6 and 10 mils.

The relatively thick coextruded tape is quenched for example in water, and then optionally irradiated with between about 1 and 5 megarads, and more preferably about 3 megarads of irradiation.

The coextruded tape is then slit and opened out to form a sheet, and then passed to a unit where it is essentially monoaxially oriented at between about 2.5:1 and 7:1 in the longitudinal direction. More preferable orientation ranges are 2.5:1 and 4.5:1, and even more preferable is an orientation drawing ratio of about 3.0:1 in the longitudinal direction.

A useful apparatus for the stretching operation is a Kampf unit. This unit includes heated rolls heated to preferably a temperature between about 180° F. and 280° F. More preferably, the rolls are heated to a temperature between about 200° F. and 250° F., and even more preferably to a temperature of about 230° F.

Although the film is referred to as a monoaxially oriented film, and is oriented primarily in the longitudinal direction, some incidental orientation is desirable in the transverse direction. This small degree of transverse direction orientation helps the film to grip a container or vessel after heat shrinking. The particular Kampf unit used in the examples does not afford significant incidental transverse orientation, but those skilled in the art will understand that suitable apparatus are available to achieve a small amount of transverse orientation.

Typical film thicknesses may range from for example 0.5 to 4 mils. A preferred film thickness is about 2 mils. Increasing film thicknesses will provide more stiffness to the film in cases where a higher modulus is desired because of limitations of label-making equipment.

The invention may be further understood by reference to the following examples.

EXAMPLE 1

A core layer of high density polyethylene (DuPont Alathon 7835) having a density of 0.96 grams per cubic centimeter was extruded from a first extruder in a coextrusion arrangement. Intermediate layers of a 20% vinyl acetate EVA (DuPont PE-3432 EVA) were extruded as a split stream from a second extruder. Outer layers of a blend of 92% EPC (Norchem PP3303GK) and 8% polypropylene (Himont PD064) were extruded from third and fourth extruders respectively. The various melt streams were extruded as a tubular tape from a coextrusion die. The core layer comprised about 30% of the total thickness of the tape and resulting film. The outer layers each comprised about 25% of total film thickness, and intermediate layers each comprised about 10% of total film thickness.

After rapid water quenching of the extruded tape, the tape was irradiated at a dosage of 4 megarads at a line speed of 37.5 feet per minute. The irradiated tape was then slit and opened into a sheet, and passed through a Kampf orienting unit at a line speed of 78 feet per minute, with heated rolls at a temperature of about 230° F.

By rotating the heated rolls at a higher velocity than the feed rolls, the film was longitudinally drawn at an orientation ratio of 4.5:1.0. The initial tape width of 24 inches reduced to 22.5 inches during orientation.

EXAMPLE 2

A film substantially similar in composition to that of EXAMPLE 1 was produced but having a draw ratio of 4.0:1.0.

EXAMPLE 3

A film substantially similar to EXAMPLES 1 and 2 was produced but having a draw ratio of 3.5:1.0.

All three examples produced films suitable for use in labeling equipment wherein the film, in rollstock form, is fed to a labeling unit. The labeling machine severs the film at a length corresponding to the final circumference of a label to be wrapped around a can, bottle, or similar vessel. An adhesive may be applied to the interior side of the film, i.e. that surface of the film which will contact the vessel, and/or the portion of the vessel itself which will bear the label.

Alternatively, labels can be pre-cut from the film and prepared as sleeves, to be inserted over for example cans or bottles and slipped onto the portion of the vessel where the label is to be placed.

In either embodiment, the film can be preprinted to carry indicia such as trademark data, contents, weight, and like information.

Suitable modifications may be made in the film, such as the introduction of desirable pigments to one or more of the resins used to prepared the multilayer film.

One particularly desirable feature of this film is its essentially monoaxial orientation. After the application of the label by either of the embodiments described above, the vessel bearing the label is passed through a hot air shrink tunnel or other shrinking means, to tighten the label around the vessel. Because of the essentially uniaxial orientation of the film, a tight fitting label is produced without significant shrinkage or warpage of the film in the transverse direction.

Although the present invention has been described in connection with preferred embodiments, it should be understood that modifications may be made without departing from the principles and scope of the invention, as those skilled in the art will readily understand. Accordingly, such modifications and variations may be practiced within the scope of the following claims.

What is claimed is:

1. A shrink film, oriented in primarily one direction, comprising:
    (a) a cross-linked core layer comprising a high density polyethylene;
    (b) two cross-linked outer layers each comprising ethylene propylene copolymer, polypropylene, or blends thereof; and (c) two cross-linked intermediate layers each bonding the core layer to a respective outer layer and comprising an ethylene copolymer selected from the group consisting of ethylene vinyl acetate copolymer, ethylene alkyl acrylate copolymer, ethylene alpha-olefin copolymer, and chemically modified derivatives of any of said ethylene copolymers and containing carboxylic acid or acid anhydrides.

2. The film according to claim 1 wherein the outer layers each comprise a blend of about 5% to 95% ethylene propylene copolymer, and about 95% to 5% polypropylene.

* * * * *

UNITED STATES PATENT AND TRADEMARK OFFICE
CERTIFICATE OF CORRECTION

PATENT NO. : 4,828,928
DATED : May 9, 1989
INVENTOR(S) : Gautam P. Shah

It is certified that error appears in the above-identified patent and that said Letters Patent is hereby corrected as shown below:

In column 4, line 62, before "shrink film" insert --multilayer--.

Signed and Sealed this

Second Day of January, 1990

Attest:

JEFFREY M. SAMUELS

Attesting Officer     Acting Commissioner of Patents and Trademarks